United States Patent [19]

Siblik

[11] 4,094,542
[45] June 13, 1978

[54] DETENTABLE AUTOMATIC HATCH LATCH APPARATUS

[75] Inventor: Allen D. Siblik, Mundelein, Ill.

[73] Assignee: MacLean-Fogg Lock Nut Co., Mundelein, Ill.

[21] Appl. No.: 619,857

[22] Filed: Oct. 6, 1975

[51] Int. Cl.² .......................... E05C 3/30; B63B 19/14
[52] U.S. Cl. ................................................. 292/256.5
[58] Field of Search ............ 292/256.5, 126, DIG. 72, 292/336, 124

[56] References Cited

U.S. PATENT DOCUMENTS

| | | | |
|---|---|---|---|
| 196,030 | 10/1877 | Martin | 292/124 |
| 2,239,327 | 4/1941 | Holby | 292/336 |
| 2,288,926 | 7/1942 | Strader | 292/99 |
| 2,816,683 | 12/1957 | Miers et al. | 220/57 |
| 3,324,817 | 6/1967 | Olsson | 292/256.5 X |

Primary Examiner—Richard E. Moore

Attorney, Agent, or Firm—Mason, Kolehmainen, Rathburn & Wyss

[57] ABSTRACT

Novel hatch latch apparatus operable upon dropclosing of an elongated trough or circular hatch cover to effect automatic locking of the hatch cover's striker bar to a covered hopper car's roof whereby the hatch cover's compression seal is compressably seated and sealed against the hatch opening's coaming. Detented unlatching of the hatch cover is effected by operation of an associated detent lever which positively places the apparatus' latch lever out of operational engagement with the hatch cover's striker bar. When in the inoperative detent position, the novel latch apparatus is further operable upon a subsequent drop-closing of the hatch cover and its associated striker bar to effect reactivation of the latch lever from the detent position to the normal latching position, therefore again effecting automatic locking.

5 Claims, 6 Drawing Figures

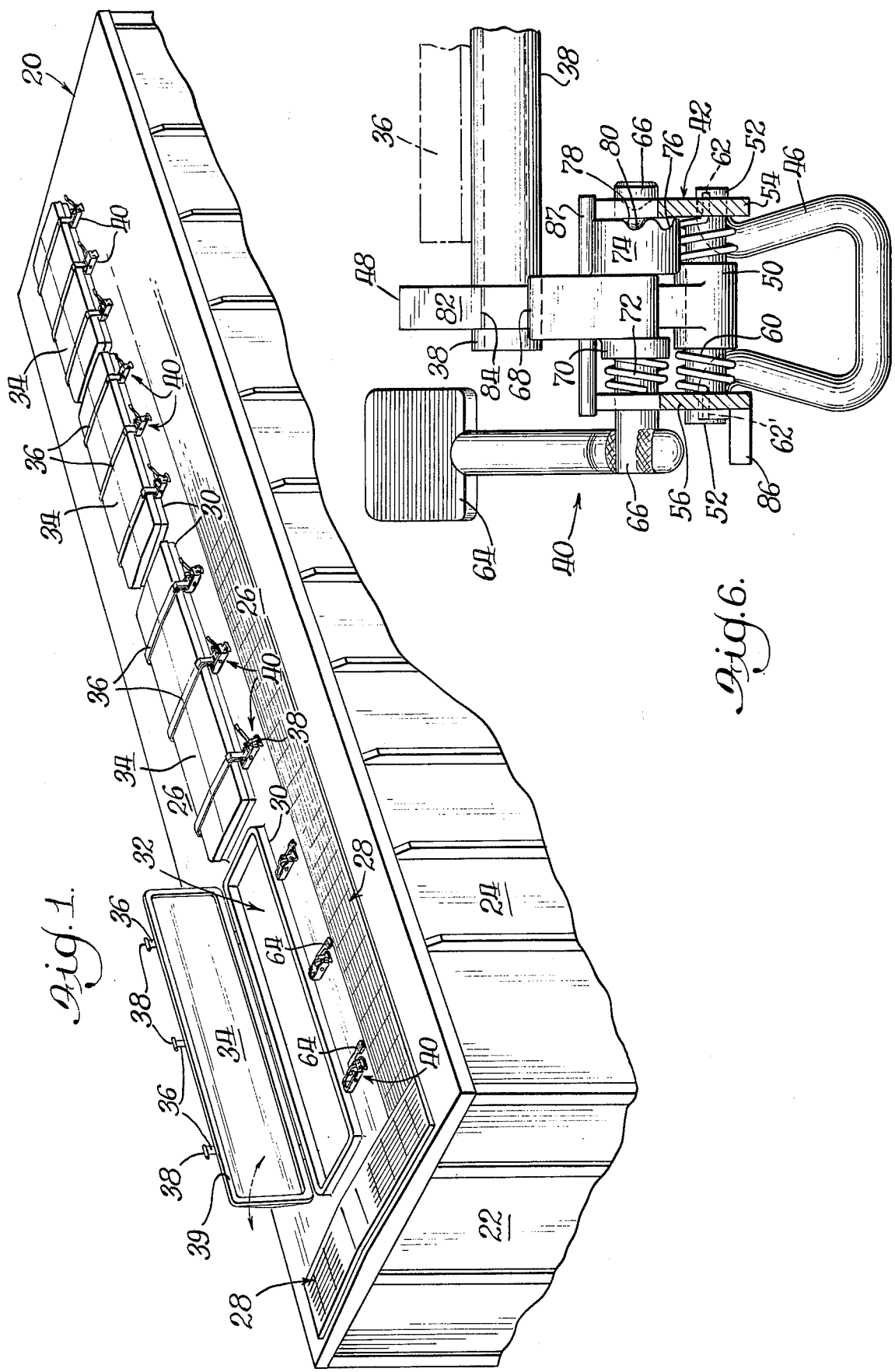

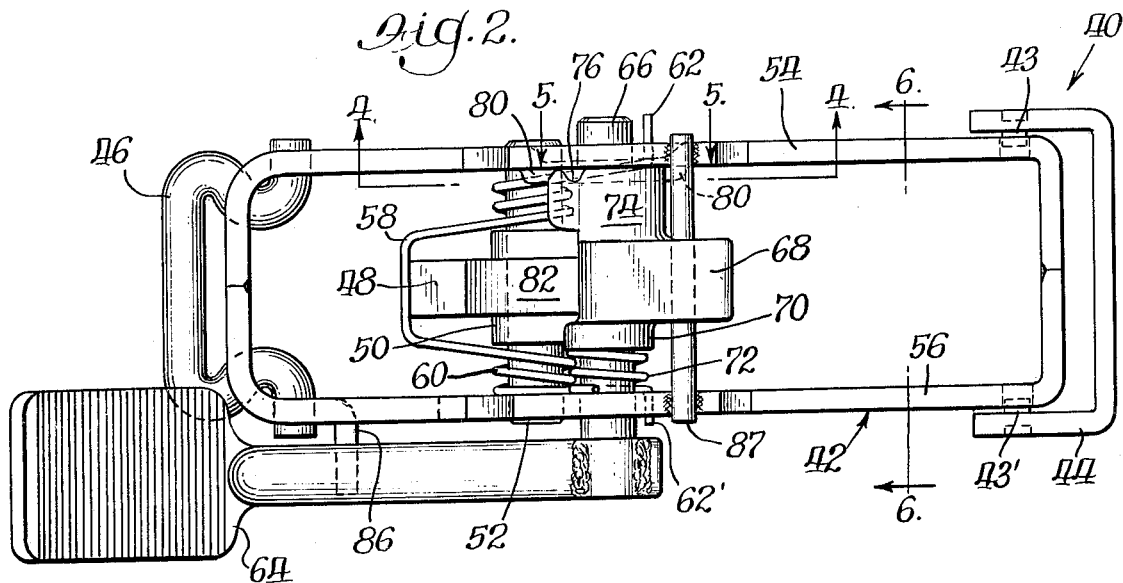
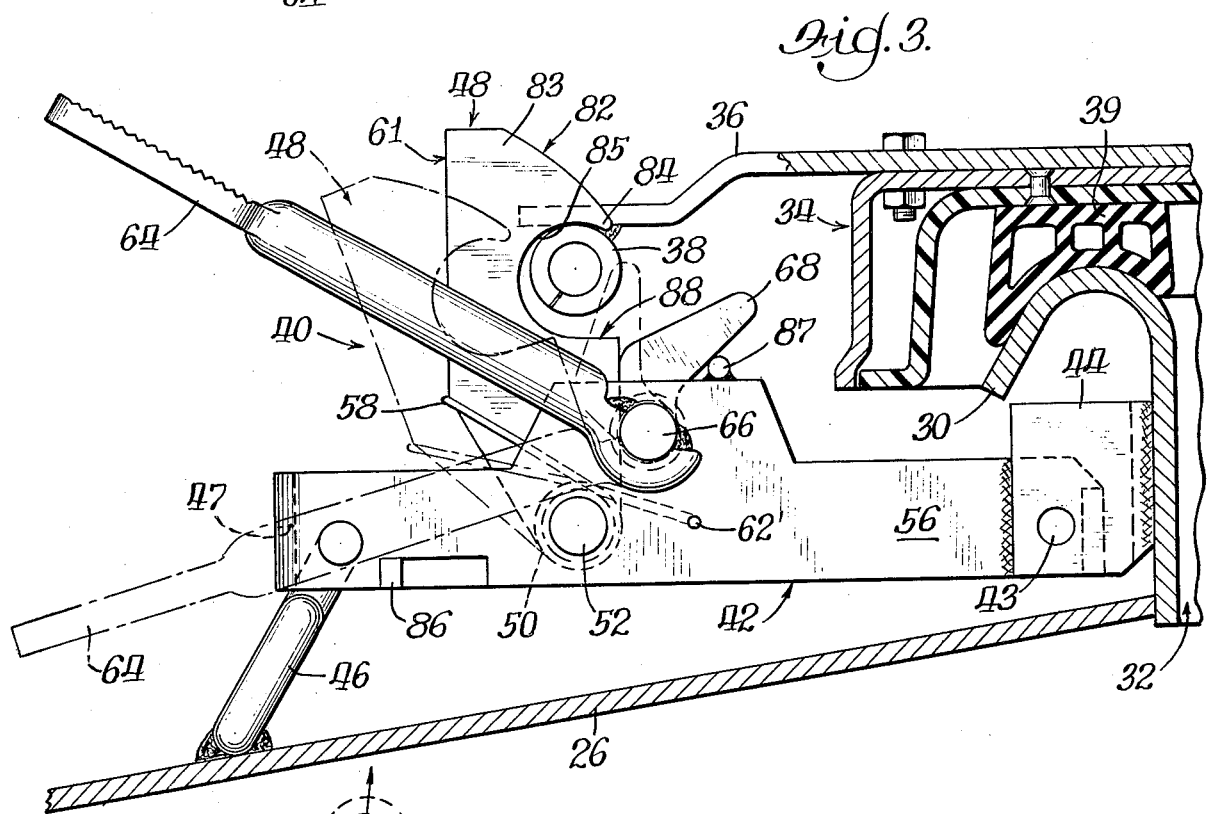
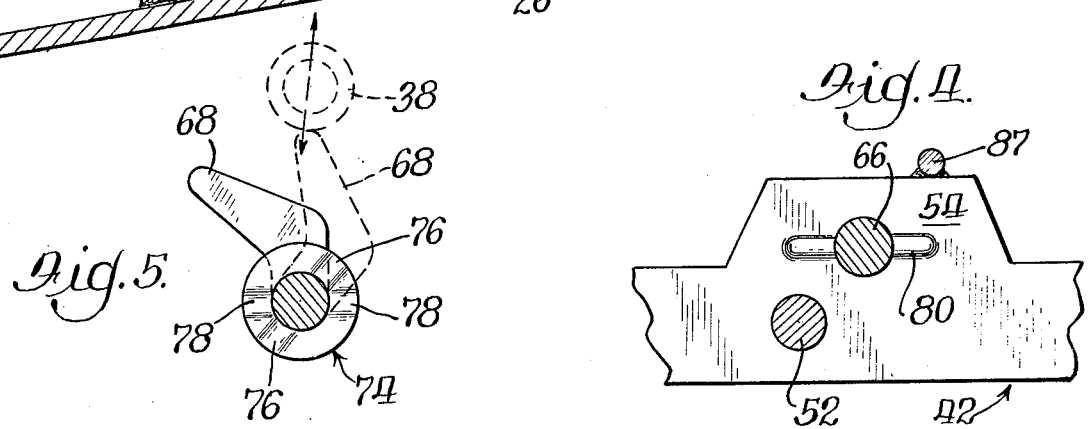

DETENTABLE AUTOMATIC HATCH LATCH APPARATUS

BACKGROUND OF THE INVENTION

The present invention relates to latching devices for elongated or circular hatch covers, and more particularly, to automatic hatch cover latching apparatus having detent means for use on covered hopper railroad cars.

DESCRIPTION OF THE PRIOR ART

Many uses are made of hatch openings and associated hatch covers in material loading and shipping operations, such as in cargo ships, and in covered hopper and refrigerated railroad cars. Because of a need to quickly and safely load compartmentalized covered hopper rail cars, such cars having circular roof hatch openings are being rapidly replaced with cars having elongated or trough-type hatch openings.

Such trough hatch openings can be of any elongate configuration but typically have either squared or rounded ends. The material loading chutes used to fill the car's various compartments can readily be moved from one end of the trough hatch opening to the other without the need for repetitively manually placing the chute into plural, confining, circulartype hatch openings. To cover and seal off such elongated openings from the elements, lightweight hatch covers made of metal and sometimes fiberglass are hinged to the rail car's roof along one side of each trough hatch opening. Some trough hatches are formed with an end-to-end camber, i.e., high at their center regions. A trough hatch cover typically carries a downwardly extending rubber compression seal adjacent its outer edge for directly seating and sealing against the hatch opening's upstanding coaming. (The latter can be of various shapes and constructions, some being formed integrally with the car roof's decking). Hatch covers are typically rigidly bolted, or sometimes pivotally connected, to a metal striker plate one end of which forms the aforementioned hinged connection to a rail car's roof. The other end of the striker plate terminates in some form of striker bar which itself is engaged by a latch mechanism, the latter being rigidly fastened to the car roof. After a hopper car is loaded, these elongated covers are swung over and latched down against the car roof for subsequent car shipment.

A latch mechanism is, of course, utilized to assure that during car shipment the hatch cover will not swing open, which could result in possible hinge or hatch cover damage due to the latter's flapping in the wind, or even spoiling of the car's contents.

Examples of various types of known hatch latch devices include pivotable bolt and wing nut locks, toggle locks, pivotable weighted latches, automatic latch mechanisms mounted internally of the car, and numerous manual lever-type latches. By way of information, prior art apparatus typifying such hatch cover latching devices are illustrated in the following United States Letters Patent Nos:

1,800,396  3,797,411
2,816,683  3,800,714
3,760,743  3,804,026

However, each known hatch latch device has one or more disadvantages which deter from its practical or commercial implementation. Many known devices do not provide complete automatic locking of the hatch cover when it is drop-closed against the hatch coaming; many require a final manual assist to effect full locking. Almost all the known devices require some amount of manual assist — some even require complete manual operation — to effect desired hatch cover locking. Many known devices do not achieve a substantially complete latching action, and thus, trainline vibrations sometimes undesirably loosen and unlock such latches. Moreover, because of the fact that several latch devices are typically utilized with each hatch cover because of the latter's excessive length — such as three or four latches per cover, for example — the known latch devices have the further disadvantage of being incapable of being consecutively placed in a inoperative condition whereby once the last latch is so placed, the hatch cover can be manually or mechanically raised.

SUMMARY OF THE INVENTION

The present invention includes novel hatch cover latching structure and apparatus which overcomes many of the above-mentioned prior art problems. There is provided an open-bottomed housing capable of being fabricated to the covered hopper car's roof at positions adjacent the hatch opening and in any desired operational plane thereto, within limits, through pivotable locating adapters carried by the housing. The apparatus's latch lever is pivotally mounted in such housing and continuously biased by spring means into a latch ready position. An adjacent pedal-operated detent means can be operated to place the latch lever in an inoperative position thereby allowing the hatch cover's striker bar, and thus the cover itself, once all its associated latches have been so detented, to be raised. A repositioning means is also carried by the pedal-operated detent lever and, when forcibly engaged by the striker bar of a drop-closed hatch cover, operates to reactivate the latch lever from its inoperative, non-engaging, detent position to its spring-biased latching position. The herein-disclosed novel latch apparatus also includes positive stop means to prohibit excessive downward movement of the associated striker bar thereby preventing over compression of the hatch cover's rubber seal, or damage to the hatch cover, at positions adjacent the striker bar.

Drop-closing of the hatch cover is the only manual effort required to automatically lock the hatch cover to the car roof, and thereby seal the cover against the hatch opening's coaming, regardless of whether the novel latch assembly of the present invention is in the detented or latch ready position. Hatch cover unlatching is provided by separate pedal operation of each detent lever of the plural latch devices associated with the cover so that after the last latch device has been so detented, the cover can be manually raised for further loading, reloading, or cleaning of the hopper car. To obtain subsequent latching, the plural latch devices utilized to lock down each hatch cover need not be individually manually reactivated to their respective latching positions due to the above-mentioned repositioning means carried on each latch. Rather, any subsequent hatch cover drop-closing causes the plural striker bars to forcibly engage the latches's repositioning means and thus reactivate each latch from the detent to the latching position.

As will become obvious, the latching apparatus of the present invention can be mounted either transversely or longitudinally of the railroad car to facilitate acceptance of any of the variously designed hatch cover striker plates and striker bars. The novel apparatus can also be mounted in any of several operational planes, via the above-noted pivotable locating adapters, thereby making it adaptable during car fabrication to any design of hatch opening coaming. Moreover, the present invention, without significant modification, is susceptible of being utilized with vertically-mounted sliding doors or even bottom discharge doors.

It is therefore a primary object of this invention to provide an automatic latching device for hatch covers regardless of their configuration.

This invention has as another object the provision of a hatch latch apparatus including detent structure for placing the latching mechanism in an inoperative position to facilitate raising of the hatch cover.

As a further object, this invention provides novel structure whereby, after the latch has been detented to facilitate cover opening, no manual repositioning or reactivation of the latch apparatus' latch lever is necessary to effect automatic locking of the hatch cover during its next drop-closing.

It is a still further object of this invention to provide an automatic latching device having a positive stop to prevent over compression of the hatch cover's resilient seal, or damage to the cover during drop-closing.

The means by which the foregoing and other objects of the present invention are accomplished and the manner of their accomplishment will be readily understood from the following specification upon reference to the accompanying drawings, in which:

FIG. 1 is a perspective view (from the end, side, and top) of a covered hopper railroad car utilizing the preferred form of the hatch cover latch apparatus disclosed herein, and with hatch cover structure shown in various operational positions;

FIG. 2 is a plan view of the hatch latch apparatus disclosed herein shown in the unfabricated condition;

FIG. 3 is a side view of the apparatus depicted in FIG. 2 having alternate operational positions of various elements shown in phantom, and shown as fabricated to adjacent hatch cover and car roof structure, the latter depicted in section;

FIG. 4 is a fragmented sectional view of the side of the housing of the latch apparatus depicted in FIG. 2, and taken substantially along the line 4—4, and in the direction of the accompanying arrows, thereof;

FIG. 5 is a fragmented sectional view of certain elements of the disclosed invention as taken substantially along the line 5—5, and in the direction of the accompanying arrows, of FIG. 2, and with parts broken away, eliminated, or in phantom for better viewing; and FIG. 6 is a fragmented sectional end view taken substantially along the line 6—6, and in the direction of the accompanying arrows, of FIG. 2, and showing adjacent hatch cover structure in phantom.

DESCRIPTION OF THE PREFERRED EMBODIMENT

For the purpose of illustrating the invention, there is shown in the drawings a form which is presently preferred, it being understood, however, that this invention is not necessarily limited to the precise arrangement that is there shown.

Having reference to the drawings, wherein like numerals indicate corresponding elements and wherein numeral prime marks indicate similarly configured but separately located structure, there is illustrated in FIG. 1 an overall view of the operational environment of the present invention. A covered hopper railroad car generally denoted by reference numeral 20 comprises a pair of end walls 22, a pair of side walls 24, and a car roof 26. The roof 26 is preferably formed up from welded sheet metal sections and has rigidly affixed to it walkway gratings 28. Formed along the longitudinal center line of car roof 26 are plural upstanding coamings 30 which form plural elongated trough hatch openings 32. An elongated hatch cover 34, preferably formed from fiberglass or a lightweight metal, is pivotally connected adjacent each hatch opening 32 through plural striker plates 36 and through hinges (not shown) mounted on the car roof 26. Each striker plate terminates at its end opposite the hinge (not shown) in a striker bar 38. In the preferred embodiment, the latter is a hollow tubular metal section welded to the striker plate 36, but it can alternately be made of solid stock or have another configuration. A hollow compression seal 39 (as best seen in FIG. 3) is carried at the outer bottom peripheral edge of cover 34. Thus, when the cover 34 is seated, sealed, and latched against the coaming 30, the contents of railroad car 20 are assured of weather protection.

It will be obvious to those skilled in the art that the present hatch latch invention can be adapted to be utilized with any type configuration for either the striker bar 38, or striker plate 36 or coaming 30. Furthermore, it will be understood that while the herein-described preferred embodiment relates to elongated trough hatch covers, and hatch cover configuration can be adapted to be latched by the present invention, such as circular hatches, or even hatches for refrigerated carriers, for example.

As best seen in FIG. 1, the preferred embodiment of the automatic hatch latch apparatus of the present invention is generally denoted by reference numeral 40. As best seen in FIGS. 2, 3, and 6, the hatch latch 40 comprises an open bottom housing 42 having locating adapters or positioning clevises 44, 46 freely pivotally mounted at its respective ends. Such open bottom construction allows overflowing or spilled hopper car contents, such as agricultural grains or granular plastic materials, for example, to flow on through housing 42, thereby not effecting the latching operation of latch 40. During hatch and car roof fabrication, the hatch latch 40 is properly positioned along the length of coaming 30 on the side thereof opposite the hinge (not shown) of cover 34 so as to operationally mate with the respective striker bar 36. It is to be noted that the respective pivotal connections of adapter 44 (via partially punched through nubs 43, 43') and adapter 46 to housing 42 (see FIG. 2) allow for positioning of latch 40 in ay desired operational plane regarless of whether the roof 26 is of the sloping type (as in FIG. 3), or is horizontal (not shown). Also, due to the fact that the adapters 44, 46 can each be made to lie flush with the lower surface of housing 42 (see FIG. 3 wherein adapter 46 can swing up into cutout 47 on housing 42 and thus lie flush therewith), the latch apparatus 40 can even be fabricated to a vertical side wall (not shown).

After positioning, the adapters 44, 46 are rigidly fastened, such as by welding, respectively to coaming 30, and car roof 26, as well as to housing 42 (FIG. 3). The locating adapters 44, 46 and housing 42 then become a solid unit rigidly mounted on roof 26. Such an on site, adjustable fabrication of housing 42 to roof 26 ultimately assures proper latching of each cover 34 and the associated striker bars 38, as will become obvious later herein.

A latch lever 48 has a hollow bushing 50 formed at its lower end which in turn is pivotally journalled between side walls 54, 56 of housing 42 on an idler shaft 52, the latter being inserted through openings formed in the side walls 54, 56, and rigidly fastened thereto, such as by welding. An elongated loop 58 formed centrally of a torsion spring 60 resiliently engages the back surface 61 of lever 48. The ends 62, 62' of spring 60 are respectively inserted within retaining holes formed in side walls 54, 56 of housing 42, thereby stabilizing spring 60 against rotation. Accordingly, latch lever 48 is continuously biased via torsion spring 60 into its normal operating or latching position (shown as lever 48's solid line position in FIG. 3.)

A foot pedal or detent lever 64 is rigidly attached, such as by welding, to an operating shaft 66 which itself is freely pivotally mounted between side walls 54, 56 and journalled on mating holes formed therein. Preferably, the shaft 66 is a unitary cast metallic member and has a cam portion or repositioning lever 68 formed integrally at its center region, the latter being utilized to cam the lever 48 to a detented position, as will be more fully described later herein. A bushing portion 70 is also formed on shaft 66 adjacent lever 68 on the side thereof facing side wall 56 and is utilized as a bearing surface (for shaft 66) for receiving the axial biasing of a compression spring 72 harbored about shaft 66 and between side wall 56 and bushing 70. Further, the shaft 66 carries a cam member 74 at the end thereof adjacent the interior surface of the side wall 54. The cam member 74 has a pair of bisecting cam grooves 76, 78 formed on the endface thereof adjacent side wall 54 (see FIGS. 2, 5, and 6.)

Due to the continuous axial biasing of spring 72 against bushing 70, the cam grooves 76, 78 engage a cam surface 80 formed on the interior of side wall 54. As best seen in FIG. 4, cam surface 80 is formed so as to bisect the hole formed in side wall 54 which rotatably journals shaft 66, and thus, due to the face that operation of detent lever 64 rotates shaft 66, the cam 80 is capable of directly mating with either of cam grooves 76, 78. It is to be understood that the cam surface 80 can be made by any well known construction, such as a heat treated emboss on side wall 54 (FIG. 4), or a press fit bushing (not shown), for example.

As shown in FIG. 3, the solid line positions of latch lever 48 and detent lever 64 represent their respective positions when the latch apparatus 40 is in its normal or latch ready position, i.e., ready to accept drop-closing of the hatch cover 34 and its associated striker plate 36 and striker bar 38. It will be obvious that when a drop-closed striker bar 38 forcibly engages an upper cam surface 82 on a head portion 83 on latch lever 48, the lever 48 will be temporarily displaced laterally to a position approximating the one dotted in FIG. 3, but yet still under contact with bar 38. Once striker bar 38, under downward arcuate movement, clears a nose portion 84 of laterally displaced latch lever 48, the loop 58 of torsion spring 60 returns lever 48 to its solid line position of FIG. 3. FIG. 3 also shows that the head portion 83 of lever 48 has an arcuately-shaped grip surface 85 which terminates jointly with the upper surface 82 to form the nose 84. This grip surface 85 engages striker bar 38 in such a locking manner that when upwardly directed forces act on striker bar, such as by expected twisting or racking of cover 34, for example, the grip surface 85 tightly overlaps and grips striker bar 38, regardless even of trainline vibrations thereof. Once thus latched, striker bar 38 is assured to continued latching through its locking engagement with the grip surface 85, and further because of the continuous biasing of lever 48 into its latch ready position by spring 60.

The latch lever 48 carries a stop surface 88 utilized as a safeguard to prohibit any excessive downward movement of the striker bar 38 past the limits of the latter's desired latched position (FIG. 3) during possible forcible drop-closing of cover 34. This in turn prevents any excessive compression of the seal 39 against coaming 30 or any possible damage to the cover 34 adjacent the striker bar 38 especially if cover 34 is made of fiberglass. Moreover, it will be remembered that during car roof fabrication, the positioning clevises 44, 46 have the capability of allowing height adjustment of the latch apparatus 40 in relation to the uppermost sealing edge of coaming 30, so as to further prevent excessive force damage to seal 39 and cover 34. The grip surface 85 and the stop surface 88 are spaced sufficiently apart, however, so as to accept striker bars of various heights (within limits), regardless of whether they are mounted at the lower end portion of a cambered trough hatch cover, or on the higher central portion thereof. (However, it is to be recognized that in extremely cambered hatch cover situations, the operator may necessarily have to step on the higher center region of the cambered cover to complete latching at that one position when the novel latch apparatus herein-disclosed is so utilized).

To unlatch hatch latch 40 so that the hatch cover 34 can be raised, the lever 48 must be detented to an out of engagement position in relation to the striker bar 38. This is effected in this presently preferred embodiment by manually displacing detent lever 64, preferably by manual foot pedal operation, which in turn places it and the repositioning lever 64 in their respective dotted line positions of FIG. 3. (A lower stop tab 86 is formed along the lower region of housing 42 adjacent lever 64 to prohibit any excessive downward displacement of lever 64. Similarly, an upper stop member 87 is rigidly fixed, such as by welding, across the upper surfaces of side walls 54, 56 adjacent repositioning lever 68 to prevent excessive upward movement thereof).

Foot pedal depression of detent lever 64 causes several things to occur. Firstly, cam member 74 of shaft 66 is rotated by such foot pedal depression, it being remembered the member 74 is under constant axial biasing from spring 72. Accordingly, the relative cam engagement between cam member 74 and cam surface 80 changes from the position of surface 80 within cam groove 78 on member 74 (latching position), to the position of surface 80 within cam groove 76 (detented position). Secondly, such foot pedal depression simultaneously causes the repositioning lever 68 to be swung from its solid line position to its dotted line position (FIG. 3) which thereby forcibly cams latch lever 48 from its solid line latching position to its dotted line detented position. In such latter position, lever 48 is retained and made incapable of engaging striker bar 38. Thirdly, once the detent lever 64 is depressed, the repositioning lever 68 forces the previously latched striker bar 38 upwardly out of the zone of engagement with the latch lever 48 (FIG. 5). This action slightly cocks the hatch cover 34 until the very last of the plural latches 40 is finally detented. However, such racking or twisting of hatch cover 34 is not expected to create downwardly directed forces on striker bar 38 of sufficient amount as to tend to rotate repositioning lever 68, and ultimately shaft 66, to thereby allow the latch lever 48 to re-engage striker bar 38.

The above-described detent capabilities of the present invention are provided to assure that an operator can detent each of the plural hatch latches 40 (whether it be three, four, or five latches per typical hatch cover, for example), so that once all the latches are unlatched, the hatch cover 34 can be raised.

It will be additionally noted that, as seen in the dotted line detented position of lever 68 in FIG. 3, any subsequent drop-closing of hatch cover 34 will cause striker bar 38 to so forcibly engage lever 68 as to cause it and detent lever 64 to be rotatably thrust forward to their respective solid line, latching positions. Such forward rotation will normally cease when cam surface 80 has re-engaged the detent cam groove 78, and certainly when lever 68 has engaged upper stop member 87. At this time the spring 72, which is slightly compressed during such rotation as cam member 74 rides over cam surface 80, will have re-elongated so as to stabilize detent lever 64, operating shaft 66 and cam member 74, and latch lever 48 in their respective latching positions. Because of this repositioning capability of the present invention, automatic latching of striker bar 38 is effected by latch 40 regardless of whether the detent lever 64 is in its latching position or its detent position. In other words, any drop-closing of the hatch cover 34 will effect automatic latching of the hatch cover 34 against the car roof 26 without the need for any additional manual assist to reposition the latch apparatus, or even to complete the latching operation, except in extreme camber hatch cover conditions, as aforementioned.

In overall operation, and as best seen in FIG. 1, it will readily be understood that a car 20 equipped with hatch latch apparatus of the present invention can be placed in condition for loading by having an operator mount the car roof 26 and manually depress each detent lever 64 of the plural hatch latches 40 and raise and open each hatch cover 34. (This open cover condition is depicted at the extreme left or car 20 in that FIGURE.) Once the car has been loaded, the plural hatch covers 34 can be drop-closed whereupon complete automatic latching occurs. (This closed condition is depicted by the three closed covers at the right portion of car 20 in that FIGURE.) The operator need do no further manual operation to effect securement of the hatch covers 34 to the car roof.

The unique detent and full automatic latching capabilities of the present invention eliminate many of the problems and disadvantages found with hatch latch devices of the prior art, such as the need for additional manual operation to assure complete hatch cover securement, additional manual operation to reposition a latch device to its latching position once unlatched, and the requirement for complex structure to prohibit spilled car contents in the area of the latch from effecting the desired latching operation.

From the foregoing, it is believed that those skilled in the art will readily appreciate the unique features and advantages of the present invention over previous types of hatch latch devices. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. Particularly, it is obvious that certain modifications (not shown) may be made to the presently preferred embodiment without departing from its spirit, such as providing a cam structure for detent purposes mounted externally of housing 42 (instead of the herein-disclosed internally located cam grooves 76, 78, and cam surface 80), or that the single latch lever 48 could be replaced with two oppositely directed and independently spring-biased levers to grippingly engage the striker bar 38. It is therefore intended that the present invention be unrestricted by the foregoing description and drawing, except as may appear in the following appended claims.

The embodiments of the invention in which an exclusive property or privilege is claimed are defined as follows:

1. A latch apparatus for automatically releasably latching a hinged hatch cover of the type having a striker bar which is operable with closing movement of the hatch cover to forcibly engage the latching apparatus, comprising, in combination: a housing means, a latch lever means pivotally mounted on said housing means and characterized by a gripping surface for engaging a striker bar, first spring means resiliently urging said latch lever means into a normal operating position whereat said latch lever means is operable to releasably lock said striker bar, pedal lever means rotatably mounted on said housing means and operably movable to and between latching and detent positions, first cam means on said pedal means, second cam means on said housing means, second spring means operable to resiliently bias said first cam means against said second cam means whereby the same cooperate to secure said pedal lever means selectively in one of said latching and detent positions as selected, and repositioning means carried by and actuated with said pedal lever means for engaging said latch lever means, said repositioning means being operable in response to movement of said pedal lever means to said detent position to hold said latch lever means out of engagement with said striker bar, said repositioning means further being operable when forcibly struck by said striker bar to move said pedal lever means from said detent position into said latching position, whereby said latch lever means is operably repositioned to releasably lock said striker bar.

2. The invention of claim 1, and wherein said housing means is formed with an open bottom to permit spilled materials to readily pass therethrough.

3. The invention of claim 1, and wherein upper and lower stop means are formed on said housing means to prevent movement of said pedal lever means beyond said latching and detent positions.

4. The invention of claim 1, and wherein at least one locating adapted means is pivotally mounted on said housing means for adjustably positioning said latching apparatus in a desired operational plane.

5. A latching apparatus for automatically releasably latching a hinged hatch cover, of the type having striker members, against an adjacent container structure, the latch apparatus comprising, in combination; a housing assembly secured adjacent a hatch opening on a container, a latch lever member hingedly mounted on said housing assembly and biased into a normal latching position by spring means, said latch lever member being displaceable, when forcibly struck by a hatch cover's striker member, to permit latching acceptance of said striker member, detent lever means pivotally mounted on said housing assembly, a first positioning means mounted on said detent lever means, a second positioning means mounted on said housing assembly, means biasing said first and second positioning means into engagement, said biased first and second positioning means further being capable of maintaining said detent lever means in latching and detent positions respectively, and repositioning means supported by said housing assembly and pivotally responsive to movement of said detent lever means, said repositioning means being capable of forcing said latch lever means to a nonengaging position with said striker member in response to movement of said detent lever means to said detent position, and additionally being operable, when forcibly struck by said striker member to reposition said detent lever means from said detent position to said latching position, thereby permitting said biased latch lever means to assume said normal latching position and automatically latch said striker member.

* * * * *